United States Patent [19]

Maurice et al.

[11] Patent Number: 5,781,986
[45] Date of Patent: Jul. 21, 1998

[54] METHOD OF MAKING A MAGNETIC RECORDING/READING HEAD

[75] Inventors: François Maurice, Verrieres le Buisson; Jean-Marc Coutellier, Maurepas; François-Xavier Pirot, Magny, all of France

[73] Assignees: Thomson-CSF, Paris; Thomson Multimedia, Courbevoie, both of France

[21] Appl. No.: 560,384

[22] Filed: Nov. 17, 1995

[30] Foreign Application Priority Data

Nov. 29, 1994 [FR] France .................... 94 14289

[51] Int. Cl.$^6$ ........................................ G11B 5/42
[52] U.S. Cl. ................. 29/603.14; 29/603.14; 29/603.25; 29/603.26
[58] Field of Search .................. 29/603.13, 603.14, 29/603.15, 603.25, 603.26

[56] References Cited

U.S. PATENT DOCUMENTS

| | | |
|---|---|---|
| 3,564,522 | 2/1971 | Stevens, Jr. |
| 3,672,043 | 6/1972 | Trimble et al. |
| 4,477,853 | 10/1984 | Lemke . |
| 4,731,157 | 3/1988 | Lazzari ............... 29/603.13 X |
| 5,042,140 | 8/1991 | Coutellier et al. |
| 5,067,230 | 11/1991 | Meunier et al. |

FOREIGN PATENT DOCUMENTS

| | | |
|---|---|---|
| 0 032 230 | 7/1981 | European Pat. Off. |
| 0 269 489 | 6/1988 | European Pat. Off. |
| 0 406 052 A1 | 1/1991 | European Pat. Off. |
| 0 463 908 | 1/1992 | European Pat. Off. |
| 1952402 | 4/1971 | Germany . |
| WO 90/07772 | 7/1990 | WIPO . |
| WO 92/14250 | 8/1992 | WIPO . |

*Primary Examiner*—Carl E. Hall
*Attorney, Agent, or Firm*—Oblon, Spivak, McClelland, Maier & Neustadt, P.C.

[57] ABSTRACT

A method for the making of a magnetic recording/reading head comprises the following steps:

the making of magnetic excitation wires on or in a first face of a substrate having this first face and a second face opposite the first face;

the making, on the first or second face of the substrate, of at least two magnetic poles separated by a gap;

the drilling of holes through the substrate from the face opposite the one bearing the magnetic poles, each ending in such a way that there is magnetic coupling between the bottom of the hole and the pole;

the deposition of a layer of material with high magnetic permeability in the holes and in the zones of the substrate located between the holes. Applications: the making of magnetic recording/reading heads for videotape recorders, computer peripherals and professional recording machines.

15 Claims, 12 Drawing Sheets

METHOD OF MAKING A MAGNETIC RECORDING/READING HEAD

BACKGROUND OF THE INVENTION

The invention relates to a method for making a magnetic recording/reading head. It can be applied especially to the making of multiple-track heads for the reading of all types of media such as magnetic disks, magnetic tapes and magnetic cards, in all fields covering all types of equipment such as video recorders, computer peripherals, data recorders for space vehicles, etc.

The writing and/or reading of a large number of tracks very close to one another, for example tracks arranged in parallel on a magnetic tape at a pitch of 10 μm, requires a magnetic head having elementary heads compatible with an information density of this type.

The French patent application No. 2 630 853 describes the organization of a matrix head adapted to such an application. The French patent 2 648 940 describes various methods of making such a head.

However, there is a problem of the integration of the coils of the magnetic heads and of the connection of these coils to the control circuits.

The invention proposes the making of an integrated head with its coils and also the integration of the control circuits. This removes the drawbacks of the prior art. The resulting component is potentially inexpensive and provides for a greater density of gaps in a matrix organization of magnetic heads.

According to the invention, the integrated head takes the form of a component combining control logic, power transistors, multiple-turn coils and magnetic circuits.

SUMMARY OF THE INVENTION

The invention therefore relates to a method for the making of a magnetic recording/reading head comprising the following steps:

the making of magnetic excitation wires on or in a first face of a substrate comprising this first face and a second face opposite the first face;

the making, on the first or second face of the substrate, of at least two magnetic poles separated by a gap;

the drilling of holes through the substrate from the face opposite the one bearing the magnetic poles, each ending in such a way that there is magnetic coupling between the bottom of the hole and the pole;

the deposition of a layer of material with high magnetic permeability in the holes and in the zones of the substrate located between the holes.

The invention also relates to a magnetic recording/reading head comprising a non-magnetic substrate having, on one face, at least one magnetic excitation conductor and, on this face or on the opposite face, two magnetic poles separated by a gap as well as an element made of a material with high magnetic permeability having a U-shape, with the arms of this U being substantially perpendicular to the face bearing the magnetic poles and with the ends of the arms being each magnetically coupled with a magnetic pole, said element and said poles forming a magnetic circuit that surrounds the conductor, wherein the substrate is made of a semiconductor material in which the control circuits to which the conductor is connected are implanted.

BRIEF DESCRIPTION OF THE DRAWINGS

The different objects and features of the invention shall appear more clearly from the following description, and from the appended figures, of which.

MORE DETAILED DESCRIPTION

Figure 1:
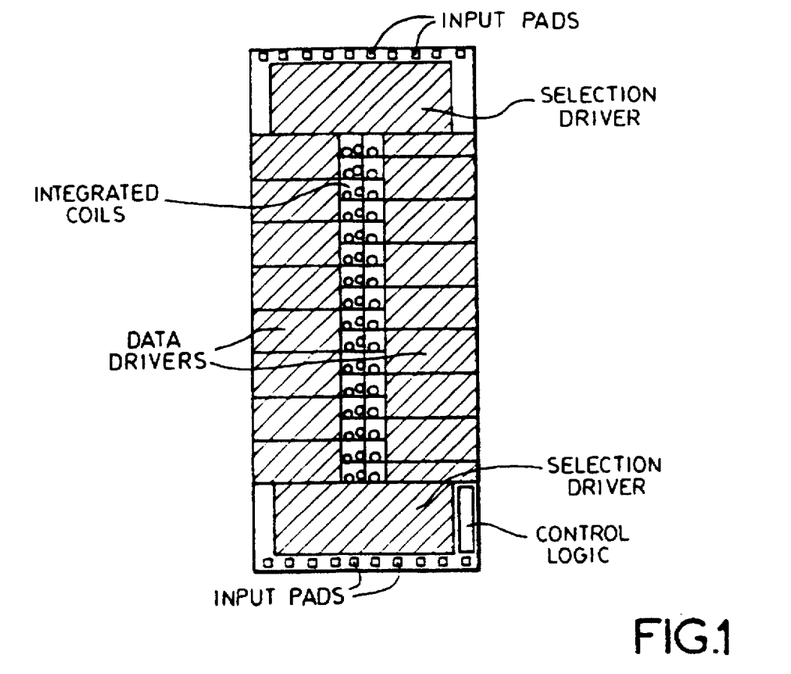
FIG. 1 shows a general exemplary embodiment according to the invention.

According to the invention, the control logic circuits, the supply transistors and the coils are made on a substrate of semiconductor material (silicon) by using a technology that is now tested and widely used on an industrial scale such as, for example, a technology using complementary MOS transistors and a double level of metallization. FIG. 1 gives a schematic view of such a circuit of the kind that can be obtained on wafers in the semiconductor industry. It will be noted that the connections are positioned on the top and bottom edges of the chip so as to free the right-hand and left-hand edges for the running of the tape.

The control transistors have a resistance well below that of the coils so that the currents are determined by the impedance of said coils. It follows therefrom that the heat dissipation zone is that of the coils.

Figure 2:
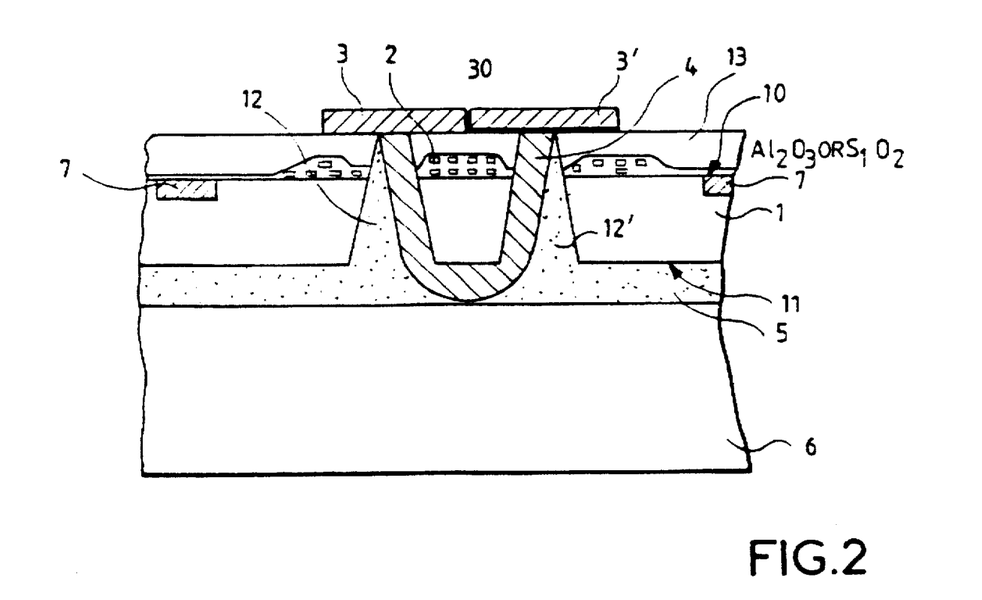
FIG. 2 shows a detailed example of a magnetic head according to the invention.

FIG. 2 shows an example of a schematic sectional view in the zone of the coils. It shows a magnetic circuit with a gap imbricated in a coil.

It has a substrate 1 bearing, on one of its faces 10, magnetic excitation conductors 2 or coil wires. The substrate 1 is, for example, made of semiconductor material (silicon for example) and control circuits 7, 7' are implanted in the substrate. The circuits 7, 7' are therefore semiconductor circuits and contain power transistor circuits that can be used to supply the connection wires with current. They are then connected by means known in the prior art to the excitation wires 2. The circuits 7, 7' may also contain logic control circuits receiving commands from the exterior and controlling the power supply circuits of the excitation wires.

Above the coils there are positioned magnetic poles 3, 3' separated by a gap 30. A layer of insulator material 13 may be provided above the excitation wires 2. This layer, whose surface is plane and slightly curved, enables the poles 3, 3' to be received easily and to be insulated from the excitation wires 2. The poles 3, 3' are made advantageously according to the method for the manufacture of thin layers as described in the French patent application No. 2 605 783.

Holes 12 and 12' go through the substrate 1 and the layer 13 and contain a material with high magnetic permeability 4 in such a way that this material is in contact or almost in contact with the poles 3, 3' so as to be magnetically coupled with the poles 3, 3'. The layer 4 therefore magnetically couples the poles 3 and 3' to each other.

Finally, a supporting plate 6 which is preferably rigid is fixed to the face 11 of the substrate 1 with, for example, bonder 5. Advantageously, the plate 6 is made of a material that is a good conductor of heat, for example silicon, to enable the cooling of the circuits.

According to the exemplary embodiment of FIG. 2, the excitation wires 2 and the circuits 7, 7' are positioned on the face 10 of the substrate but in another embodiment they could be on the face 11.

Referring to FIGS. 3a to 3e, a description shall now be given of a method for making a magnetic head according to the invention.

In a first step (FIG. 3a), control circuits 7, 7' and excitation wires 2 are made on the surface 10 of a substrate 1. In the case of an embodiment using semiconductors, the control circuits 7, 7' are implanted in the substrate and the excitation wires 2 are made on the surface of the substrate. The excitation wires 2 are electrically connected to the control circuits 7, 7'. The face 10 and the excitation wires are covered with an insulator layer 13. This layer is preferably flattened or slightly curved (in the case of applications for the reading of magnetic tapes).

Figure 3A:
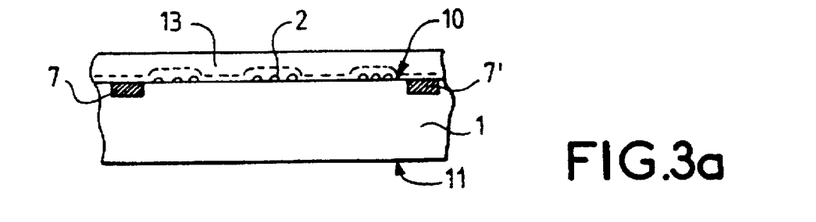
FIGS. 3a to 3e show a method for the making of a magnetic head according to the invention.
Figure 3B:
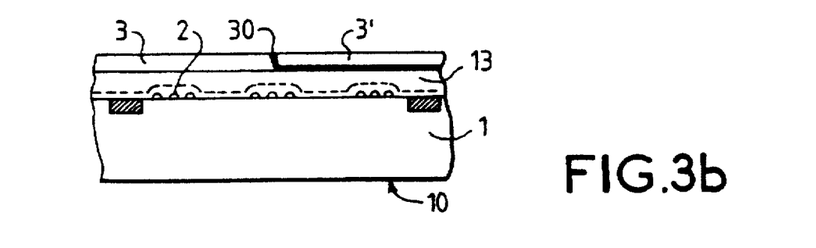
Figure 3C:
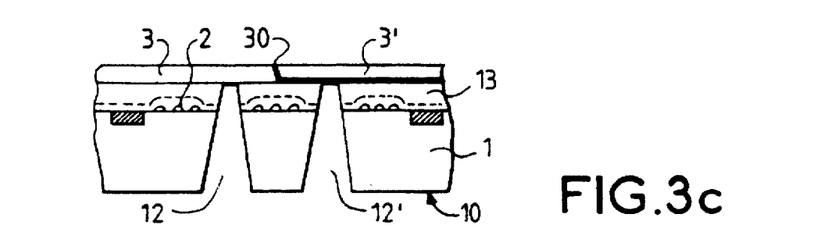

In a second step, the magnetic poles 3, 3' separated by a gap are made on the layer 13. According to a thin-layer manufacturing method, the magnetic pole 3 is made on the face 10 and then a layer of non-magnetic material 30 is made on this pole.

This non-magnetic layer 30 has a thickness smaller than that of the pole 3. A layer of magnetic material designed to form the pole 3 is then made on the unit. Then, this magnetic layer and the non-magnetic layer 30 are machined above the pole 3 so as to bring out this pole 3. Thus the structure of FIG. 3b is obtained.

According to the exemplary embodiment of FIG. 3b, the layer of non-magnetic material 30 located between the poles 3' and the face 10 has been kept but, according to another embodiment, it could be eliminated.

During a third step (FIG. 3c), holes 12, 12' are drilled in the substrate 1 from the face 11. The hole 12 preferably reaches the pole 3. The hole 12' reaches the layer 30 or the pole 3'. The holes 12 and 12' may also be holes that do not lead into the substrate 1 or the layer 13. It is enough then that there should be a magnetic coupling between the poles 3, 3' and the holes 12, 12' respectively.

In a fourth step (FIG. 3d), a material with high magnetic permeability 4 is then deposited in the holes 12, 12' and on the zone of the substrate 1 located between the holes. This material 4 is aimed at obtaining the magnetic coupling of the poles 3 and 3' and forming the element that closes the magnetic circuit of the magnetic head.

Figure 3D:
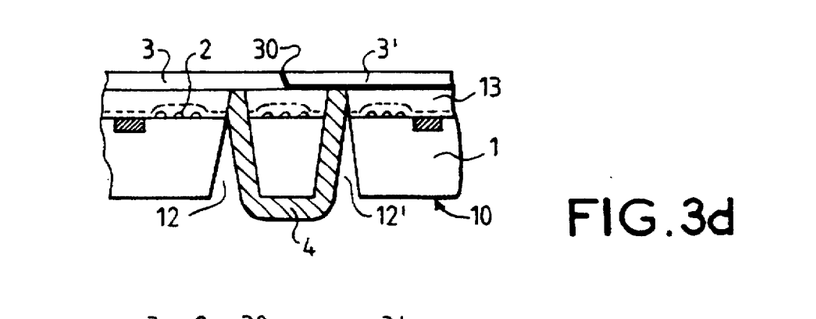

In this state, the magnetic head according to the invention is made.

In a fifth step (FIG. 3e) the face 11 of substrate may be fixed to a supporting plate 6 whose role is to make the unit rigid as well as possibly to act as a cooling unit.

Figure 3E:
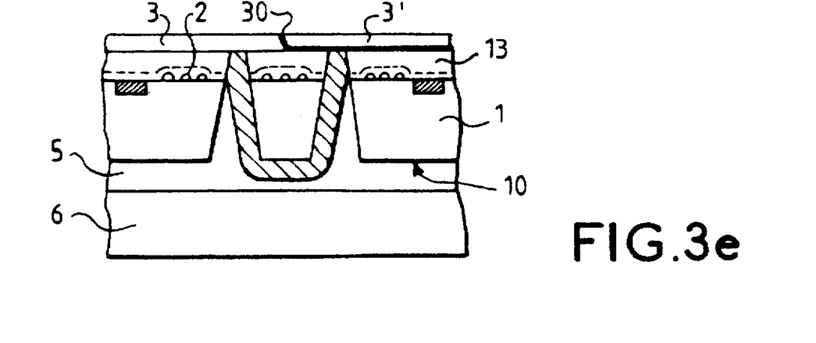

For example, the thickness of the substrate 1 may be equal to about a hundred micrometers while that of the pole 3 may be equal to about ten micrometers while the non-magnetic layer 30 is some micrometers thick.

The materials used will be for example:

substrate=silicon poles 3, 3'=sendust (alloy of iron, tin and aluminium)

layer of magnetic material 4=permalloy.

FIGS. 4a to 4e show an alternative to the method described here above.

Figure 4A:
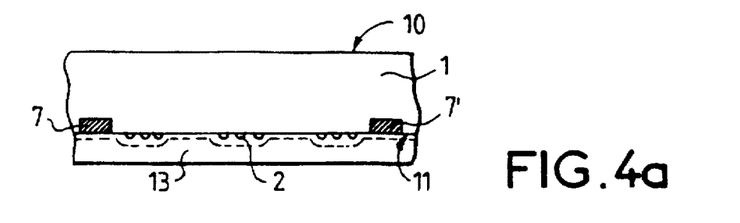
FIGS. 4a to 4e show a variant of the method of manufacture according to the invention.
Figure 4B:
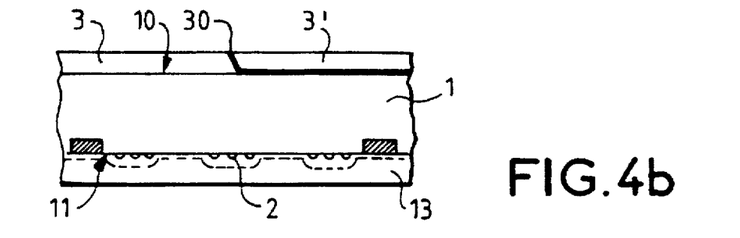
Figure 4C:
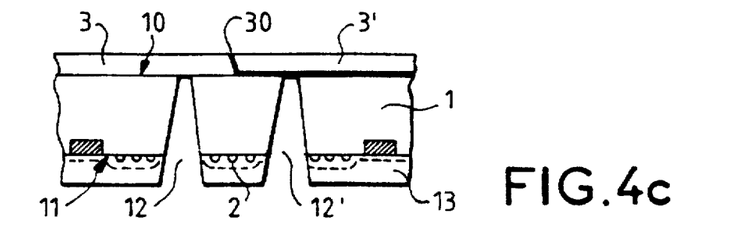

In FIG. 4a, during the first step, the excitation wires and circuits 7, 7' are made on the face 11 of the substrate.

In the second step (FIG. 4b), the magnetic poles 3, 3' are made on the face 10.

Figure 4D:
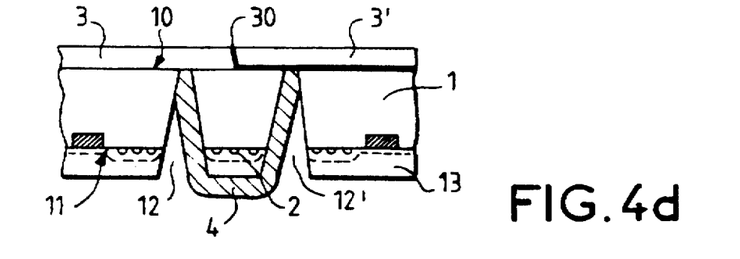
Figure 4E:
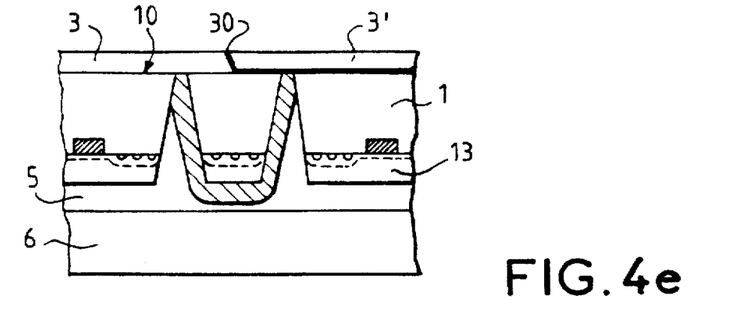

The holes 12, 12' are made during the third step (FIG. 4c) as here above. Then, the magnetic material 4 is deposited in the holes 12, 12' as above (FIG. 4d). Finally, a supporting element 6 is attached to the unit.

There is thus obtained a structure (FIG. 4e) which differs from that of FIG. 3e by the fact that the excitation wires and the control circuits 7, 7' are made on the face 11 instead of on the face 10.

The difficulty with this type of completely integrated technology is the compatibility of the operations for processing the magnetic head and the silicon circuits. There is a risk of destroying the logic transistors and the control transistors during the operations for annealing the poles. This is why an alternative method of manufacture shall now be described.

Figure 5:
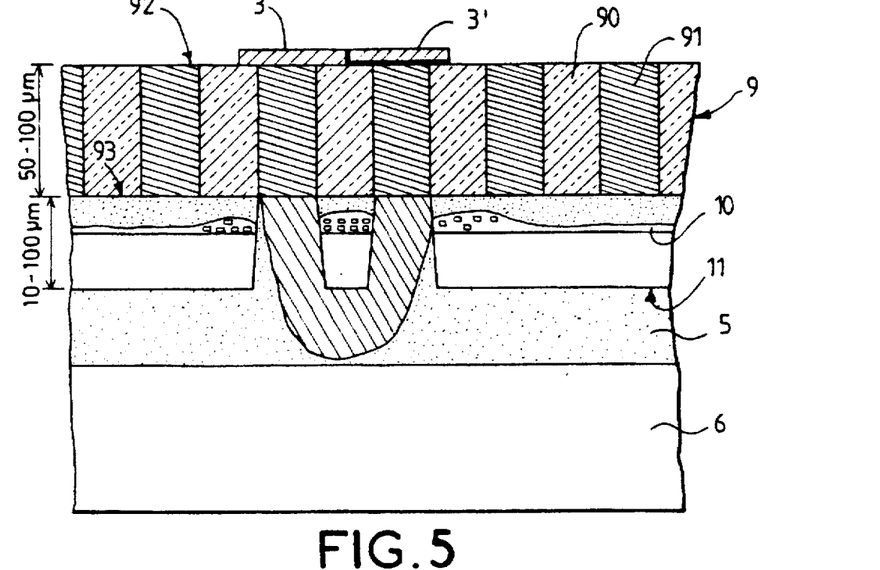
FIG. 5 shows a magnetic head and a method of manufacture according to which magnetic poles are not directly on the substrate plate.

This alternative method is illustrated in FIG. 5.

A composite plate 9 made of non-magnetic material 90 and of magnetic material 91 is made separately. The non-magnetic material 90 is, for example, glass and the magnetic material 91 is ferrite. The magnetic poles 3, 3' are made on a face 92 above magnetic zones 91 so that each of them is magnetically coupled to the face 93 of the plate 9.

During the second step described here above, this face is then fixed by bonding, for example, to the face 10 of the substrate.

The substrate 1 is then thinned out on the face 11 side and then holes are drilled in the substrate 1 before the electrodeposition of permalloy as here above. A supporting plate 6 of silicon or heat conductor may then be bonded to make the unit rigid.

Other variants may give the final result. In particular, the U-shaped permalloy structure may be obtained on the active faces of the chips (after the making of blind holes by chemical corrosion) and then the heat conductor is bonded to this active face or thinned out by the rear face up to the permalloy and the unit is bonded to the glass-ferrite composite material.

Figure 6:
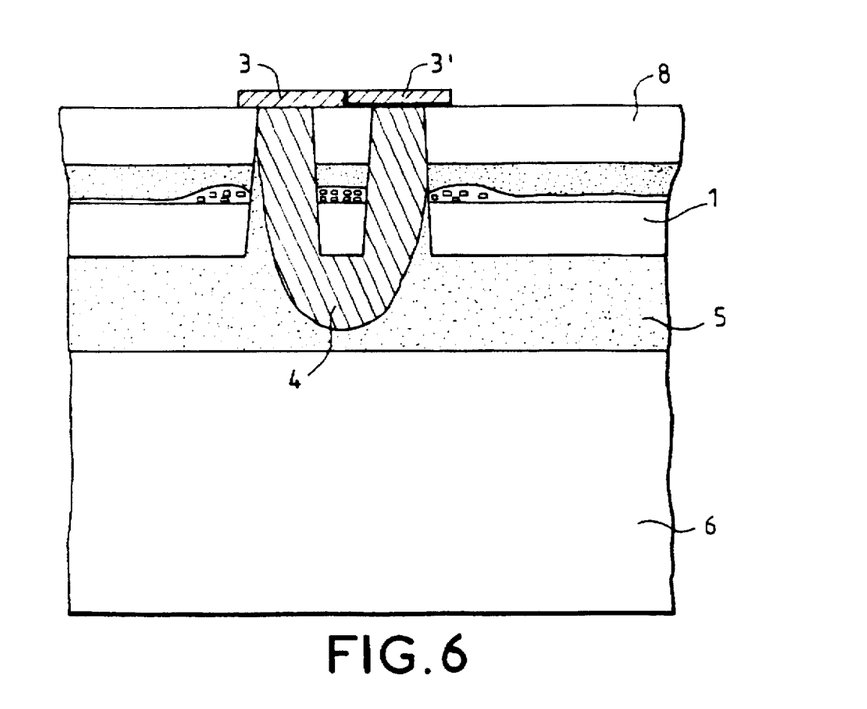
FIG. 6 shows a variant of the method of manufacture of FIG. 5.

According to another variant shown in FIG. 6, instead of using a plate 9 of composite material, a wafer 8 of homogeneous and non-magnetic material such as silicon is used. The magnetic poles 3, 3' are made on this wafer. Then this wafer is thinned out. Then, as here above, this wafer 8 is attached to the substrate plate 1 bearing the excitation wires 2 and the control circuits. The plate 1 is thinned out. Then, the holes 12 and 12' are made through the substrate 1 and through the wafer 8.

The magnetic material 4 deposited in the holes 12, 12' enables the constituting of the magnetic circuits coupling the two magnetic poles 3 and 3'.

Various alternative ways of making the magnetic closing circuit are possible. The first silicon substrate may be drilled with its blind holes (leading to the poles) before the bonding of the second substrate. These same blind holes may be filled with permalloy before bonding. This brings us to the variants explained in the above paragraph.

This embodiment is advantageous for two reasons:

the two silicon substrates 1 and 8 may have the same dimensions;

the density of the gaps may be greater than in the previous approach because there is no longer any glass-ferrite composite material used.

The coils may be made in two levels of metallization with the possibility of connecting these two levels by cross-connections that go through the substrate 1 and even through the supporting plate 6.

Figure 7:
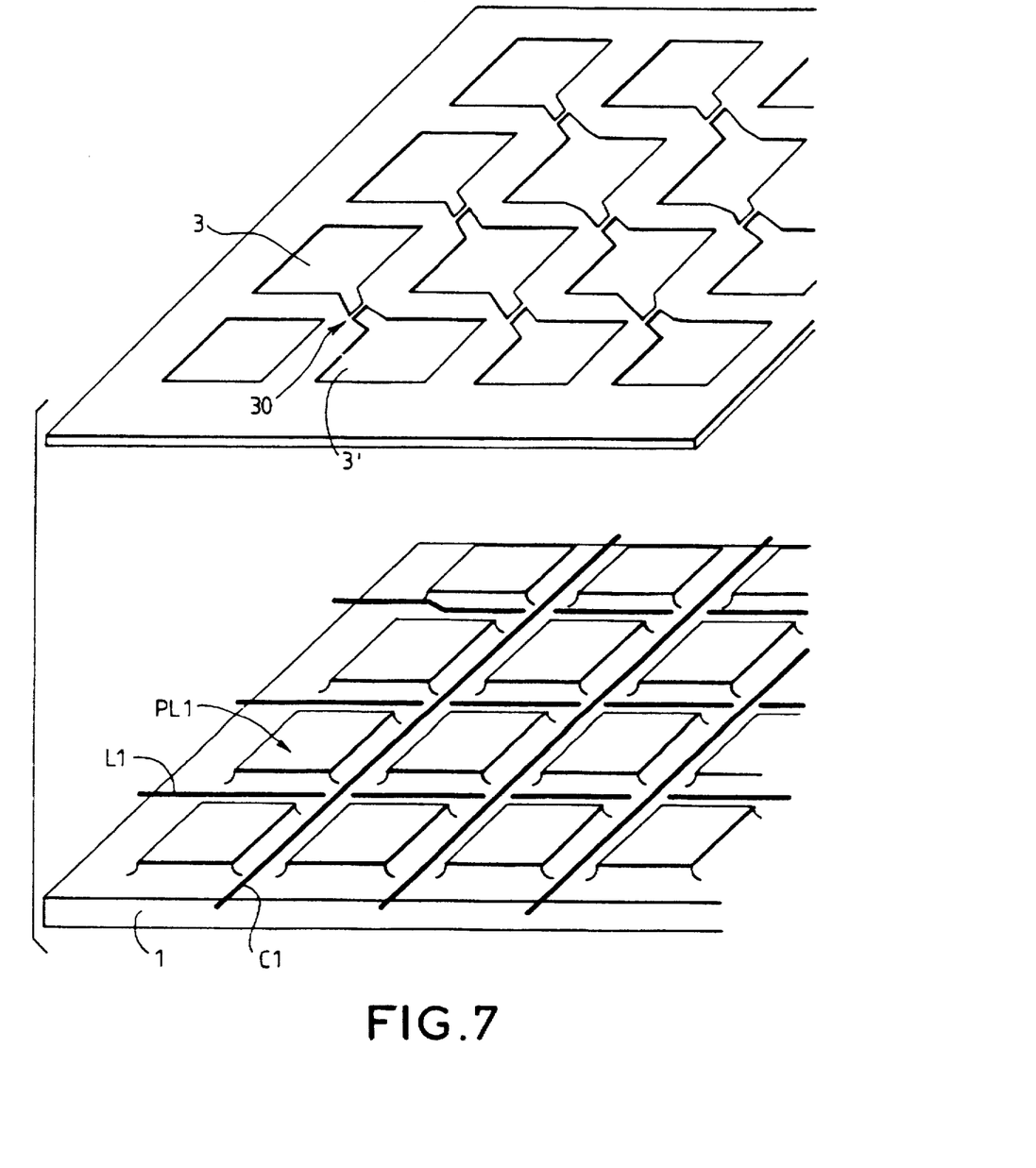
FIG. 7 shows an application of the invention to the making of matrix magnetic head.

The invention can be applied to the making of a set of matrix heads as shown in FIG. 7 and described in the French patent application No. 2 630 853.

In a set of heads such as this, the heads are organized in rows and columns. A head such as T1 has two poles 3, 3' separated by a gap 30, each located on a magnetic pad PL1 connected to a layer or to a plate of magnetic material 1. Magnetic excitation conductors or row coils L1 enable the induction of a magnetic flux in the magnetic circuits of a row of magnetic heads. Other magnetic excitation conductors or column coils C1 enable the induction of a magnetic flux in the magnetic circuits of a column of magnetic heads. A magnetic head located at the intersection of a row coil and a column coil is excited.

According to the invention, the coil conductors are not housed in grooves. They are on the surface of the substrate 1. The working of the magnetic heads is, however, the same. Their mode of coiling determines the pads PL1.

FIGS. 8 to 14 show different modes of coils made possible by the method of the invention.

Figure 8:
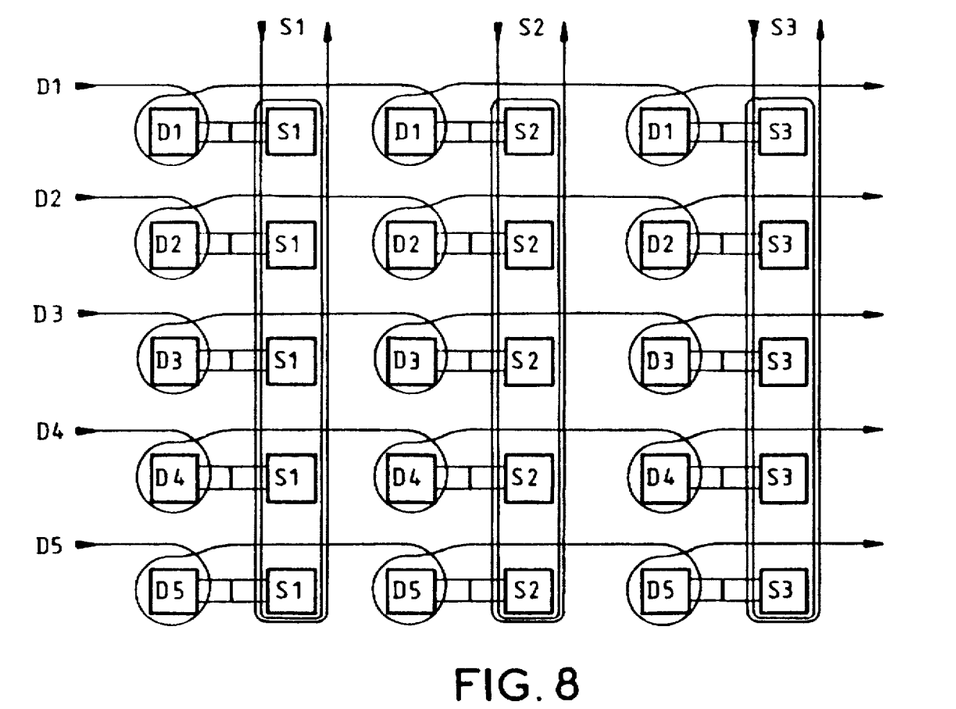
FIGS. 8 to 14 show different modes of coils of a matrix magnetic head.

FIG. 8 shows a matrix head in which each magnetic head has its own two poles. Each row of magnetic heads has a row coil, D1 for example, that is individually coiled around the poles D1 of a row. Each column of magnetic heads has a column coil S1 that is coiled around all the poles D1 to D5 of a column together. Such an arrangement enables the reduction of all cross-talk between magnetic heads owing to the fact that there is no common pole between neighboring heads. A mode of coiling such as this also enables the reduction of the inductance.

Figure 9:
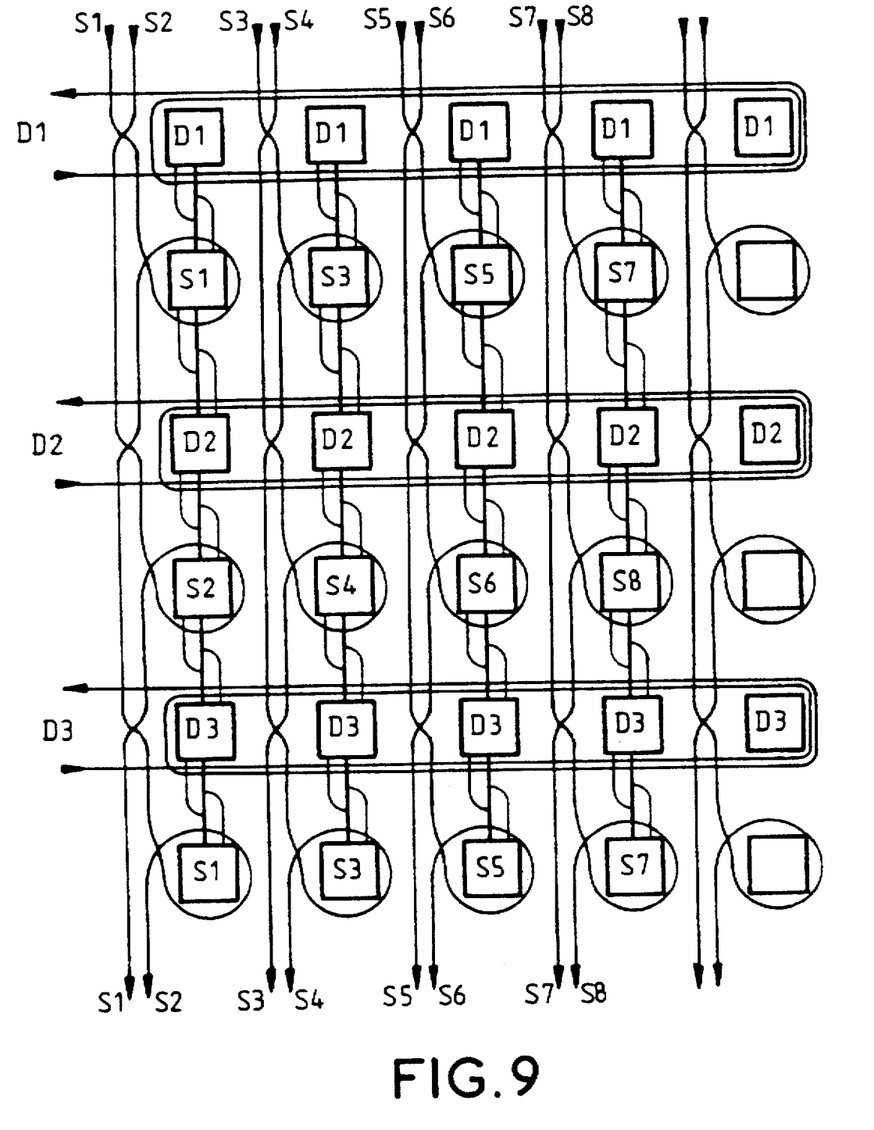

FIG. 9 shows a matrix head in which a magnetic pole is common to two heads. A row coil D1 is coiled around the poles of a row. For each column, there are two coils such as S3 and S4 coiled around the poles of a column alternately.

Figure 10:
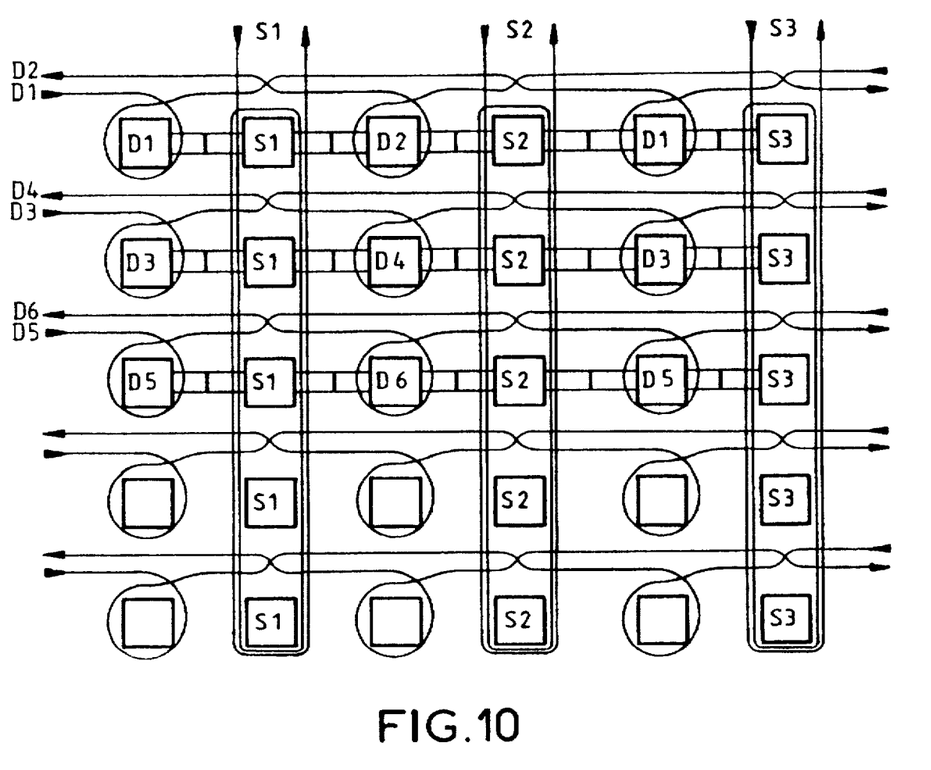

FIG. 10 shows a mode of coiling in which it is the column coils that are each common to a column of poles and in which there are two row coils coiled around the poles of a row alternately.

Figure 11:
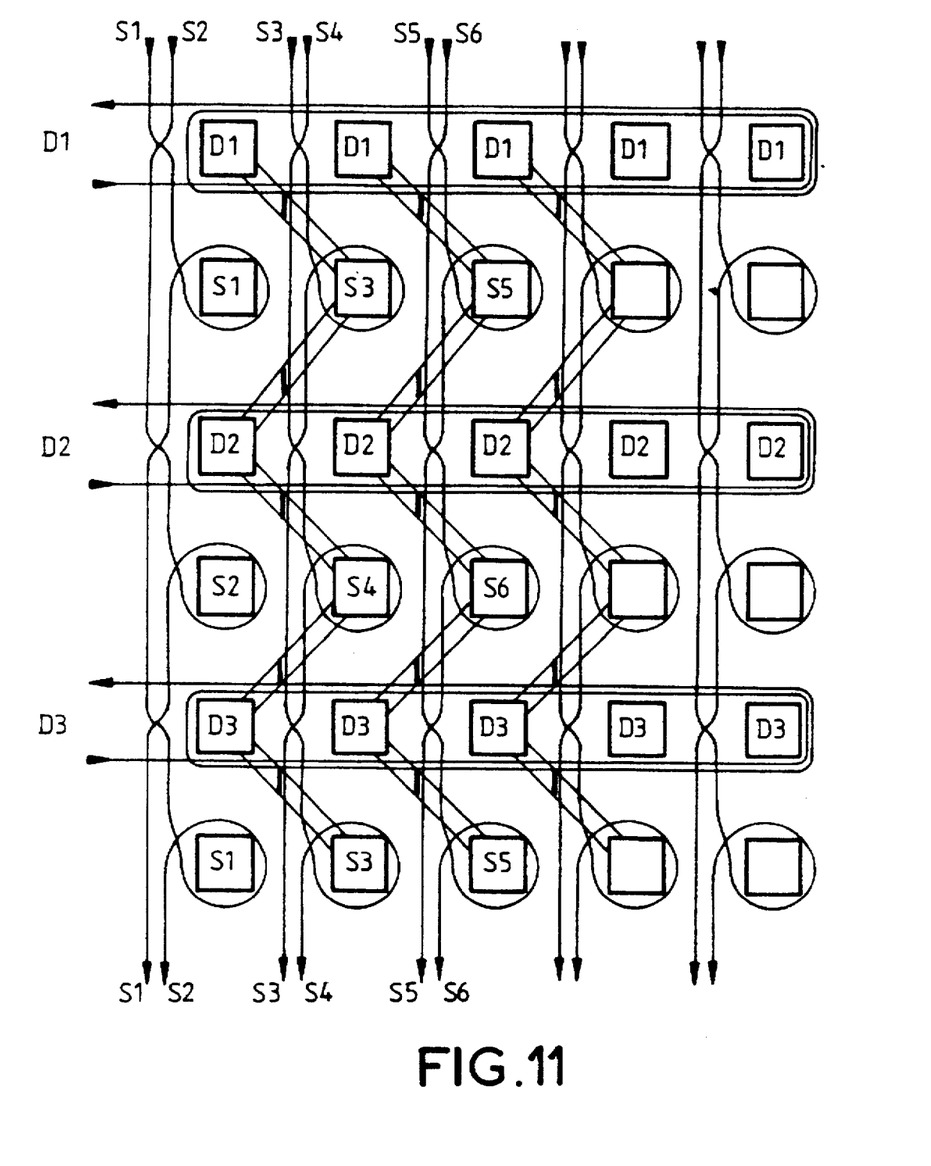

FIG. 11 shows a mode of coiling similar to that of FIG. 9, but the magnetic heads are positioned in a zigzag arrangement and connect the magnetic poles diagonally.

Figure 12:
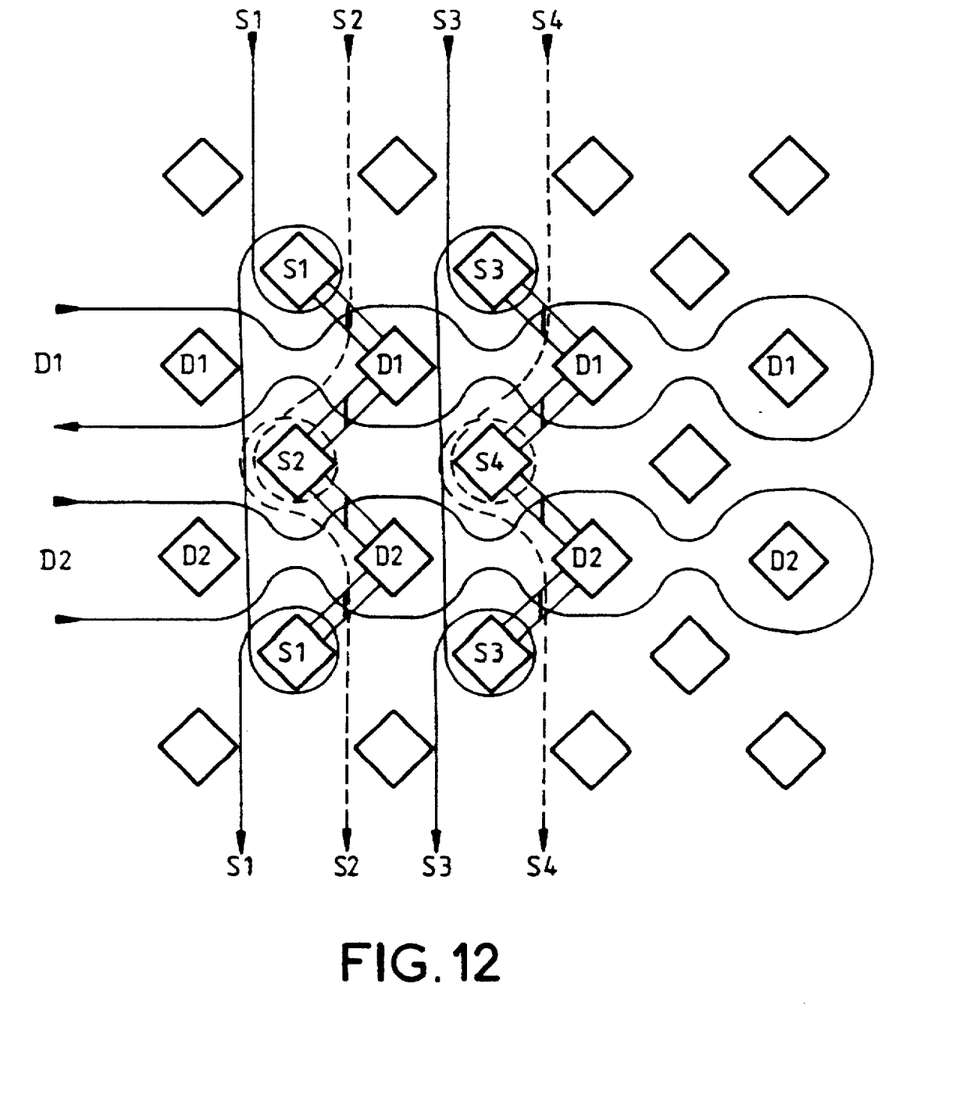

FIG. 12 shows a mode of coiling similar to that of FIG. 11 but wherein the pads and poles are square-shaped. They are positioned at 45° with respect to the direction of the rows and columns.

Figure 13:
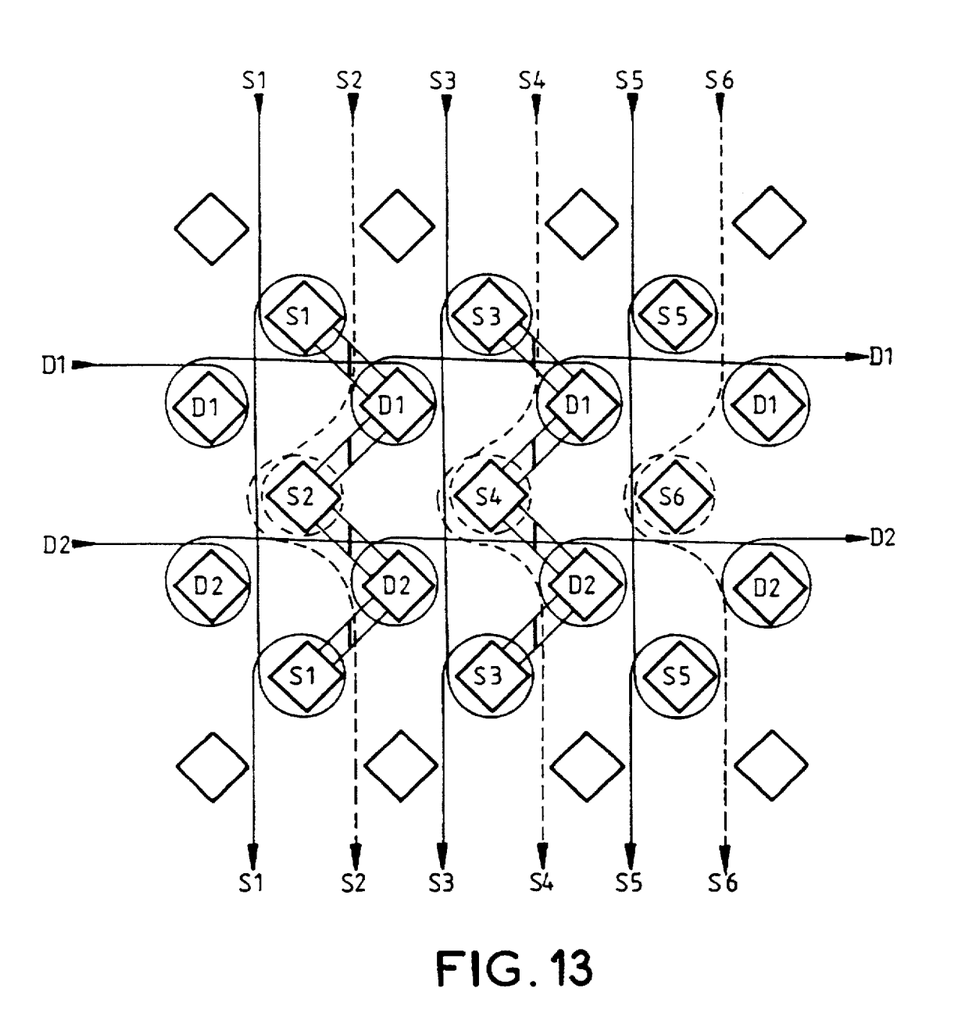

FIG. 13 shows a mode of coiling in which the pads and poles positioned at 45° (as in FIG. 12) have row coils and column coils coiled around them individually.

Figure 14:
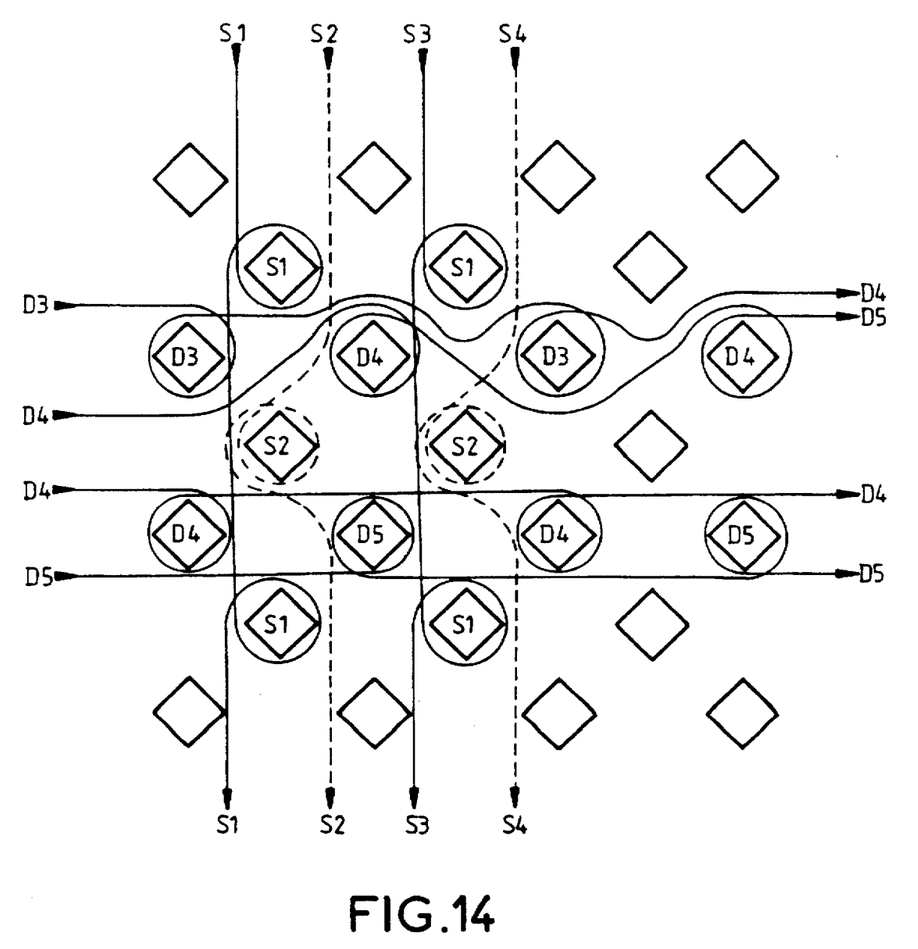

FIG. 14 shows a mode of coiling in which there are two coils per row D3, D4 for example, coiled around the poles of a row alternately as well as two coils per column S1 and S2 for example, coiled around the poles of a column alternately.

What is claimed is:

1. A method for making a magnetic recording/reading head comprising the steps of:

providing a substrate having a first face and a second face;

providing magnetic excitation wires on the first face of said substrate;

providing an insulation layer on said wires;

forming, on the insulation layer, at least two magnetic poles separated by a gap;

drilling holes through the substrate and the insulation layer from the second face of the substrate; and depositing a layer of material with high magnetic permeability in the holes for the purpose of establishing magnetic coupling between the poles.

2. A method according to claim 1, further comprising the step of bonding the second face of the substrate to a supporting plate.

3. A method according to claim 1, wherein the step of providing the magnetic poles further comprises the steps of:

providing a first magnetic pole on the insulation layer, said first pole having an edge;

providing a layer of non-magnetic material having a thickness smaller than that of the first magnetic pole on the edge of said first pole and on the insulation layer;

providing a second pole on said non-magnetic layer; and machining said second pole and the non-magnetic material located on the edge of said first pole.

4. A method according to claim 1, wherein electronic control circuits are made on or in the first face of said substrate.

5. A method according to claim 4, wherein the substrate is a semiconductor material and wherein the electronic circuits are implanted in the substrate.

6. A method according to claim 1, wherein the material with high magnetic permeability is permalloy.

7. A method according to claim 1, wherein the step of providing the magnetic poles further comprises the steps of:

providing an intermediate plate having a first face and a second face;

providing at least two magnetic poles separated by a gap on the first face of said intermediate plate; and bonding the second face of the intermediate plate to said insulation layer.

8. A method according to claim 7, wherein the intermediate plate is made of non-magnetic material.

9. A method according to claim 7, wherein the intermediate plate is made of a composite material of magnetic elements and non-magnetic elements perpendicular to said first and second faces, the magnetic elements magnetically coupling each pole to the second face of the intermediate plate.

10. A method for making a magnetic recording/reading head comprising the steps of:

providing a substrate having a first face and a second face;

providing magnetic excitation wires on the second face of said substrate;

providing an insulation layer on said wires;

forming, on the first face of said substrate, at least two magnetic poles separated by a gap;

drilling holes through the substrate and the insulation layer from the second face of the substrate; and depositing a layer of material with high magnetic permeability in the holes for the purpose of establishing magnetic coupling between the poles.

11. A method according to claim 10, further comprising the step of bonding the insulation layer to a supporting plate.

12. A method according to claim 10, wherein the step of providing the magnetic poles further comprises the steps of:

providing a first magnetic pole on the first face of said substrate, said first pole having an edge;

providing a layer of non-magnetic material having a thickness smaller than that of the first magnetic pole on the edge of said first pole and on the first face of said substrate;

providing a second pole on said non-magnetic layer and on the first face of said substrate; and machining said second pole and the non-magnetic material located on the edge of said first pole.

13. A method according to claim 10, wherein electronic control circuits are made on or in the second face of said substrate.

14. A method according to claim 13, wherein the substrate is a semiconductor material and wherein the electronic circuits are implanted in the substrate.

15. A method according to claim 10, wherein the material with high magnetic permeability is permalloy.

* * * * *